(12) United States Patent
Shen et al.

(10) Patent No.: US 9,477,356 B2
(45) Date of Patent: Oct. 25, 2016

(54) SYSTEM AND METHOD TO DRIVE TOUCH PANEL TO MEASURE HOVER

(71) Applicant: Qualcomm Technologies, Inc., San Diego, CA (US)

(72) Inventors: Guozhong Shen, San Jose, CA (US); Ozan E. Erdogan, Sr., San Jose, CA (US); Daniel S. Christman, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 14/108,672

(22) Filed: Dec. 17, 2013

(65) Prior Publication Data

US 2014/0375598 A1 Dec. 25, 2014

Related U.S. Application Data

(60) Provisional application No. 61/837,051, filed on Jun. 19, 2013.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04108* (2013.01)

(58) Field of Classification Search
CPC ........ G06F 3/041; G06F 3/044; G06F 3/047; G06F 2203/04111
See application file for complete search history.

(56) References Cited

U.S. PATENT DOCUMENTS

| | | | | |
|---|---|---|---|---|
| 4,087,625 A | * | 5/1978 | Dym | G06F 3/044 178/18.06 |
| 8,638,112 B2 | * | 1/2014 | Day | G06F 3/044 178/18.03 |
| 8,988,384 B2 | * | 3/2015 | Krah et al. | 345/174 |
| 2002/0154039 A1 | * | 10/2002 | Lambert et al. | 341/33 |
| 2007/0074914 A1 | * | 4/2007 | Geaghan | G06F 3/044 178/18.06 |
| 2008/0158178 A1 | * | 7/2008 | Hotelling et al. | 345/173 |
| 2011/0018557 A1 | * | 1/2011 | Badaye | G06F 3/044 324/658 |
| 2011/0062974 A1 | * | 3/2011 | Day et al. | 324/713 |
| 2012/0133614 A1 | * | 5/2012 | Bytheway | G06F 3/044 345/174 |
| 2013/0265276 A1 | * | 10/2013 | Obeidat et al. | 345/174 |
| 2015/0261377 A1 | * | 9/2015 | Reynolds | G06F 3/0416 345/174 |

* cited by examiner

*Primary Examiner* — Dorothy Harris
(74) *Attorney, Agent, or Firm* — Weaver Austin Villeneuve & Sampson, LLP

(57) ABSTRACT

Techniques in accordance with the present disclosure allow the detection of hover events and/or touch events performed over the touch panel without requiring that the touch panel be equipped with additional hardware and/or materials. In one or more implementations, the apparatus includes a touch panel controller configured to operatively couple to a touch panel sensor. The touch panel sensor includes at least one drive electrode and at least one sense electrode. The touch panel controller includes output circuitry operatively coupled to the at least one drive electrode. The output circuitry is configured to generate drive signals to drive the drive electrode (i.e., drive the touch panel sensor). The touch panel controller also includes input circuitry operatively coupled to the at least one sense electrode. The input circuitry is configured to measure mutual-capacitance between the at least drive electrode and the at least one sense electrode to detect a hover event. The present disclosure is directed to driving a subset of rows (or columns) and senses the subset of the remaining rows (or columns). Thus, the same sensor can measure multi-touch event and hover without changes to sensor pattern.

19 Claims, 6 Drawing Sheets

SYSTEM AND METHOD TO DRIVE TOUCH PANEL TO MEASURE HOVER

CROSS-REFERENCE TO RELATED APPLICATIONS

The present application claims the benefit under 35 U.S.C. §119(e) of U.S. Provisional Application Ser. No. 61/837,051, filed Jun. 19, 2013, and titled "SYSTEM AND METHOD TO DRIVE TOUCH PANEL TO MEASURE HOVER." U.S. Provisional Application Ser. No. 61/837,051 is herein incorporated by reference in its entirety.

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, media devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

Techniques in accordance with the present disclosure allow the detection of hover events and/or touch events performed over the touch panel without requiring that the touch panel be equipped with additional hardware and/or materials. In one or more implementations, the apparatus includes a touch panel controller configured to operatively couple to a touch panel sensor. The touch panel sensor includes at least one drive electrode and at least one non-intersecting sense electrode. The touch panel controller includes output circuitry operatively coupled to the at least one drive electrode. The output circuitry is configured to generate drive signals to drive the drive electrode (i.e., drive the touch panel sensor). The touch panel controller also includes input circuitry operatively coupled to the at least one sense electrode. The input circuitry is configured to measure mutual-capacitance between the at least drive electrode and the at least one sense electrode to detect a hover event.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Mobile electronic devices, such as smart phones, electronic tablets (e.g., e-readers), or the like, utilize touch panel sensors to detect touch events performed over a touch panel of the mobile electronic device.

Accordingly, an apparatus configured to detect an object performing a hover event over a touch panel sensor is disclosed. In one or more implementations, the apparatus includes a touch panel controller configured to operatively couple to a touch panel sensor. The touch panel sensor includes at least one drive electrode and at least one non-intersecting sense electrode. For example, the drive electrode may be at least substantially parallel to the sense electrode. The touch panel controller includes output circuitry operatively coupled to the at least one drive electrode. The output circuitry is configured to generate drive signals to drive the drive electrode (i.e., drive the touch panel sensor). The touch panel controller also includes input circuitry operatively coupled to the at least one sense electrode. The input circuitry is configured to measure mutual-capacitance between the at least drive electrode and the at least one sense electrode to detect a hover event.

When an electrode is driven, an electric field is created between a driven electrode and a non-driven electrode. The electric field extends at least partially beyond the plane defined by a touch panel. For instance, the electric field characterized by electric field lines that extend into the surrounding environment (e.g., the air). Thus, when an object (i.e., a finger or a stylus) enters into the surrounding environment, the touch panel sensor system is configured to measure a change in mutual-capacitance due to the object altering the electric field. In an implementation, the touch controller is configured to drive a subset of rows to measure a change in mutual-capacitance between a driven row and a non-driven row. In another implementation, the touch controller is configured to drive a subset of columns to measure a change in mutual-capacitance between a driven column and a non-driven column. Thus, techniques in accordance with the present disclosure allow the detection of hover events and/or touch events performed over the touch panel without requiring that the touch panel be equipped with additional hardware and/or materials. In a traditional touch screen panel rows (columns) are driven and columns (rows) are sensed. The present disclosure is configured to drive a subset of rows (or columns) and senses the subset of the remaining rows (or columns).

Example Implementations

Figure 1A:
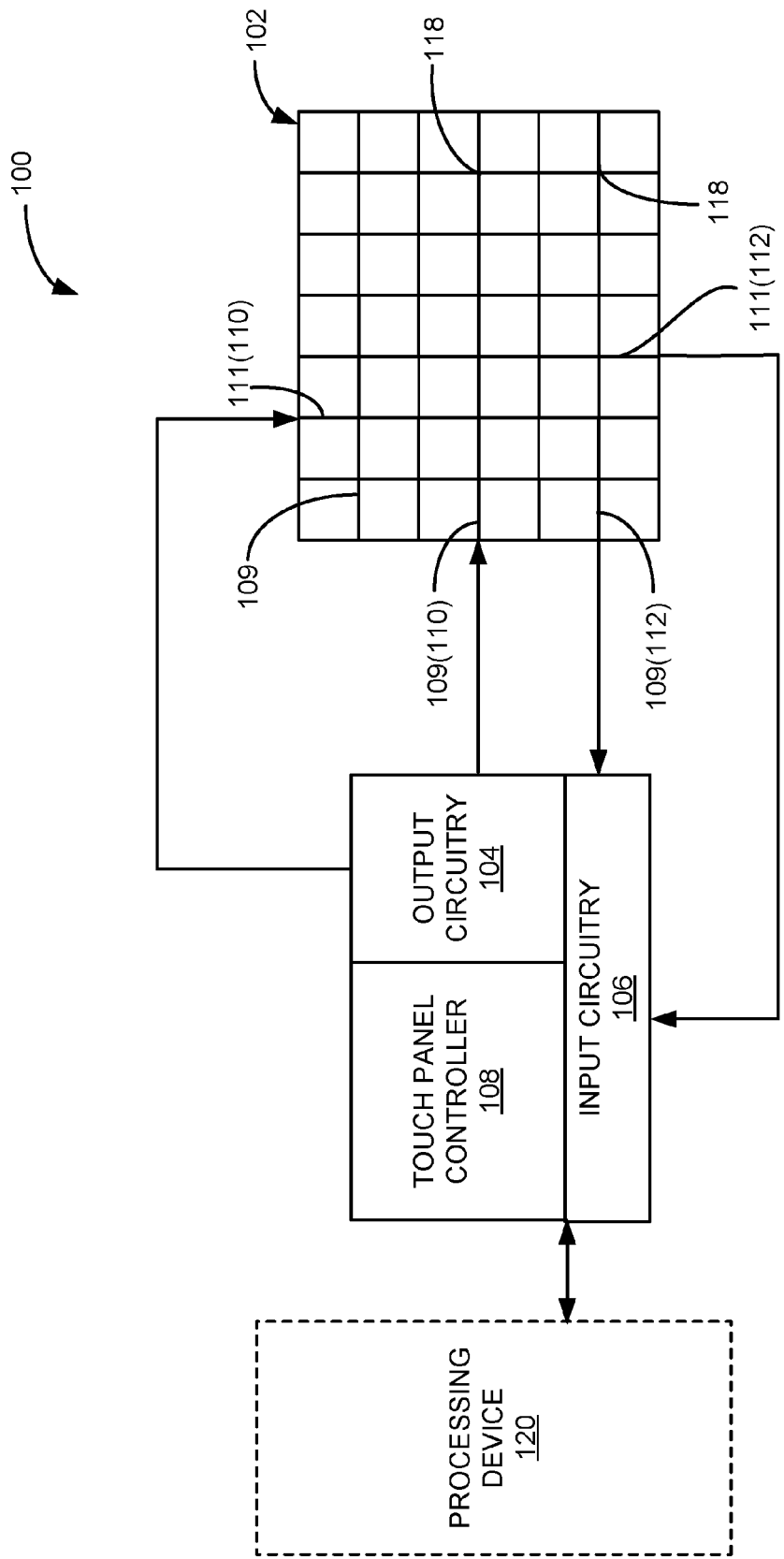
FIG. 1A is a block diagram illustrating a touch panel sensor system in accordance with an example implementation of the present disclosure.

FIG. 1A illustrates a touch panel sensor system 100 in accordance with an example implementation of the present disclosure. The touch panel sensor system 100 includes a touch panel sensor 102, output circuitry 104 (e.g., one or more sensor drivers), input circuitry 106, and a touch panel controller 108. As shown, the touch panel controller 108 is operatively connected (via a communication interface, such as a data bus, or the like) to a touch panel sensor 102. In one or more implementations, the touch panel sensor 102 is utilized to sense (e.g., detect) a touch event and/or hover event over a surface of a touch panel. For example, the touch panel sensor 102 can include a capacitive sensing medium having a plurality of row traces 109 (e.g., electrodes) and a plurality of column traces 111 (e.g., electrodes) for detecting a change in capacitance due to a touch and/or hover event performed over a surface of the touch panel. During various operational states of the system 100 as described detail herein, the row traces 109 may comprise driving lines 110 or sensing lines 112, and the column traces 111 may comprise driving lines 110 or sensing lines 112. A row electrode 109 that is also a driving line 110 may be designated in the drawings as 109(110) and a column electrode 111 that is also a driving line 110 may be designated in the drawings as 111(110). Similarly, a row electrode 109 that is also a sensing line 112 may be designated in the drawings as 109(112) and a column electrode 111 that is also a sensing line 112 may be designated in the drawings as 111(112). Thus, the touch panel sensor system 100 is configured to recognize touch events and/or hover events performed over a surface of a touch panel. The touch panel sensor system 100 is also configured to recognize hover events performed over the sensor 100.

In a specific implementation, the touch panel sensor 102 is a transparent panel positioned in front of a display device, such as a liquid crystal display, cathode ray tube, plasma displays, or the like. However, in other implementations, the display device and the touch panel sensor may be distinct (i.e., touch panel sensor is not positioned in front of the display device). The row and the column traces can be formed from a transparent conductive material, such as Indium Tin Oxide (ITO) or Antimony Tin Oxide (ATO), although other transparent and non-transparent materials, such as copper or silver, may be used. In some implementations, the row and the column traces can be perpendicular to each other such that the row and column traces define a coordinate system and each coordinate location comprises a capacitor formed at the intersection of the row and column traces, as described in greater detail herein. In other implementations, other non-Cartesian orientations are also possible.

Figure 2:
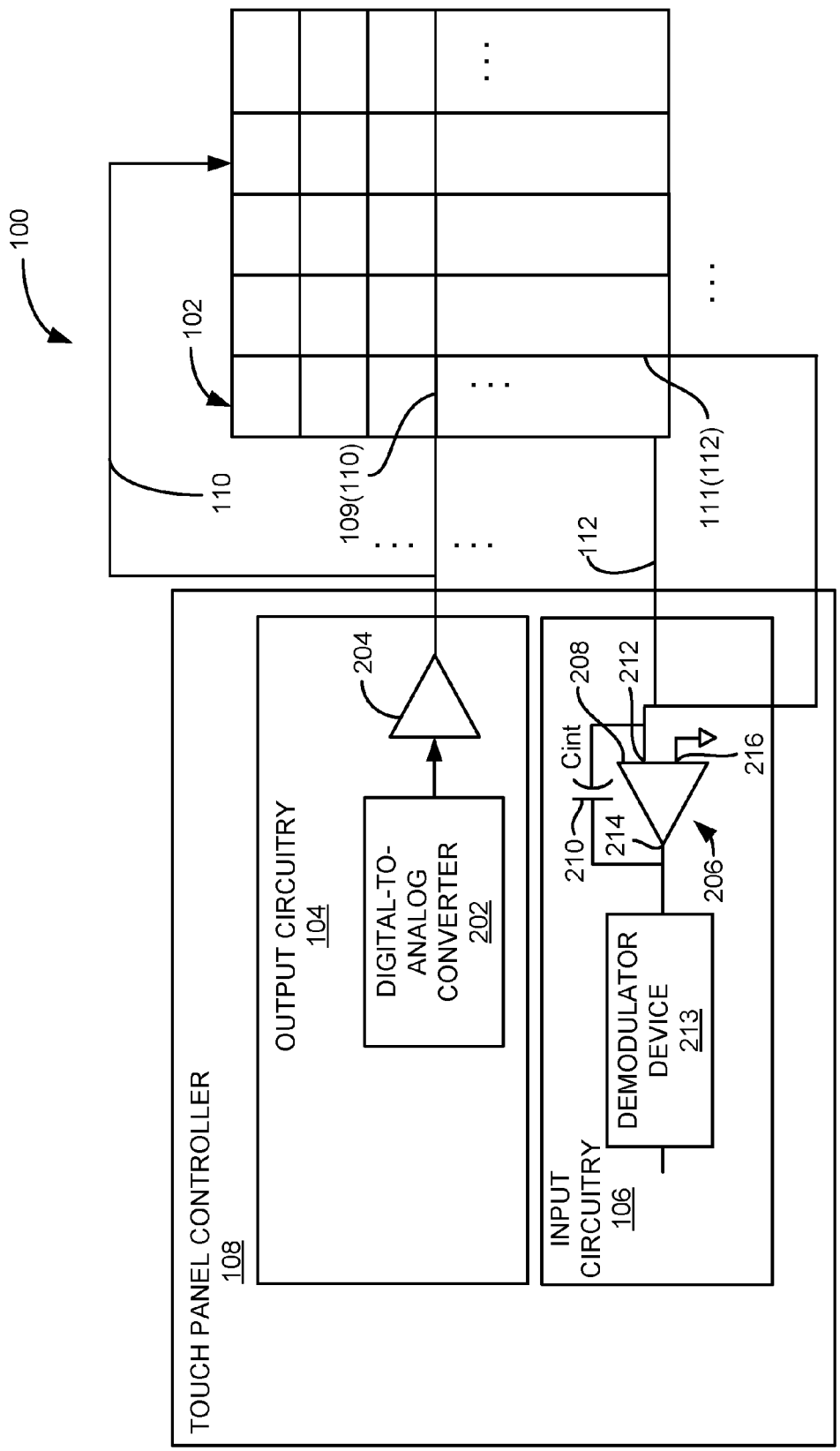
FIG. 2 is a circuit diagram illustrating a touch panel controller in accordance with a specific implementation of the present disclosure.

The touch panel controller 108 is configured to interface with the touch panel sensor 102 to stimulate the sensor 102 (e.g., stimulate the driving lines) and to detect (e.g., read) the change in capacitance from the sensing lines. In accordance with one or more implementations of the present disclosure, the system 100 is configured to detect hover events and/or touch events performed over a touch panel. In one or more implementations, the touch panel controller 108 comprises firmware and/or application specific integrated circuitry (ASIC) that is configured to drive the driving lines 110 (e.g., drive channels). In an implementation, the controller 108 may comprise firmware and/or ASIC that provides processing functionality to the system 100. In other implementations, a processing device (i.e., a processor) 120 may be communicatively coupled to the controller 108 to provide processing functionality for the system 100. For example, the processing device 120 may be configured to provide operating instructions to the touch panel controller 108, as well as receive signals representing capacitive values from the controller 108 and determine (e.g., identify, etc.) one or more positions of an object performing a touch event over the sensor 102. As shown in FIG. 1A, the touch panel controller 108 includes circuitry 104 (e.g., output circuitry) configured to output drive signals (e.g., a sensor driver) having waveform characteristics that drive the driving lines. In a specific implementation, as shown in FIG. 2, the sensor driver may be a digital to analog converter 202 (DAC), which is electrically connected to a buffer 204. The buffer 204 is electrically connected to a respective driving line 110. However, in some implementation, the sensor driver may comprise other suitable devices capable of producing driving signals. The controller 108 also includes sensing circuitry (e.g., sensing channels) 106 (e.g., input circuitry) for measuring (e.g., detecting) a change in capacitance due to a touch event performed over the touch panel sensor 108.

In an implementation, a subset of electrodes (rows 109 or columns 111) may be charged by driving corresponding electrodes with a predetermined voltage signal having a waveform corresponding to a particular frequency characteristic. The controller 108 is configured to sense a change in mutual-capacitance by measuring a change in mutual-capacitance between a non-intersecting non-driven electrode (row 109 or column 111) and the driven electrode (row 109 or column 111) due to a touch event or a hover event. For example, the controller 108 is configured to drive one or more electrodes (i.e., rows 109 or columns 111), and the controller 108 is then configured to measure the mutual-capacitance between the driven electrode(s) and the non-intersecting non-driven electrode(s). Thus, in an implementation, the controller 108 is configured to measure the mutual-capacitance between a driven row 109 and a non-driven row 109. In another implementation, the controller 108 is also configured to measure the mutual-capacitance between a driven column 111 and a non-driven column 111.

As described above, the touch controller 108 is configured to measure the mutual-capacitance between a driven electrode 110 and a non-intersecting non-driven electrode 112. It is contemplated that non-intersecting electrodes may be defined as electrodes arranged in an at least substantially parallel configuration. For example, the electrodes may be arranged in a parallel configuration. In another example, the electrodes may be arranged in an at least substantially parallel configuration (i.e., electrodes are not exactly parallel due to design considerations or fabrication processes). It is also contemplated that the present disclosure may also be directed to electrodes having non-parallel sensor design configurations (e.g., electrodes having other shape arrangements, such as circular or the like).

In another mode of operation, the system 100 is configured to measure touch event events performed over a touch panel. During this mode of operation (e.g., sensing a touch event) each intersection 118 of the driving lines 110 (e.g., rows 109 or columns 111) and the sensing lines 112 (e.g., rows 109 or columns 111) represents a pixel that has a characteristic mutual-capacitance. A grounded object (e.g., a finger, a stylus, etc.) that moves towards a corresponding pixel 118 may shunt an electric field present between the corresponding row and column intersection, which causes a decrease in the mutual-capacitance at that location. In an implementation of the present disclosure, during operation, each row (or column) may be sequentially charged by driving (via the sensor drivers) the corresponding drive line 110 with a predetermined voltage signal having a waveform corresponding to a particular frequency characteristic. The capacitance of each intersection 118 is measured. That is, the sensing circuitry 116 is configured to measure capacitive coupling of the drive signals between the drive lines 110 and the sensing lines 112 to determine the capacitance of an object with respect to each node (e.g., an intersection 118 pixel). As described above, in some implementations, the columns are configured to represent driving lines 110 as well.

The controller 108 is configured to generate the drive signals (e.g., via the circuitry 114) necessary to scan (e.g., measure or determine the change in capacitance within) the touch panel sensor 102. For example, the controller 108 is configured to cause the output circuitry 104 to output signals having a predefined frequency characteristic (e.g., generate an output signal occurring within a predefined range of frequencies). The sensing circuitry 106 is configured to monitor (e.g., determine) the charge transferred in a given time to detect changes in capacitance at each node. The positions within the touch panel sensor 102 where the capacitance changes occur and the magnitude of those changes are used to identify and to quantify the touch and/or hover events performed over the sensor 102. Thus, driving the drive lines 110 and sensing the charge transfer as a result of the touch and/or hover event is a function of the controller 108. In some implementations, the sensing circuitry 116 may comprise a plurality of integrator devices 206. As shown, each integrator device 206 is coupled to a corresponding sensing line. As shown, the integrator devices 206 comprise a charge amplifier 208 having an integrating capacitor ($C_{int}$) 210 electrically connected between an inverting terminal 212 and an output terminal 214 of the charge amplifier 208. The charge amplifier 208 also includes a non-inverting terminal 216. The charge amplifier 208 is configured to transfer the input charge (e.g., charge from the sensing lines 112) to the integrating capacitor 210 and to generate an output voltage at the output 214 at least approximately equal to the voltage across the capacitor 210. Thus, the output voltage is proportional to the charge at the integrating capacitor 210 and, respectively, to the input charge. However, in another implementation, the sensing circuitry 116 may comprise any device (e.g., circuitry) capable of receiving a capacitance and outputting a voltage that corresponds to the capacitance. The output 214 of the charge amplifier 208 is electrically connected to a demodulator device 213. In one or more implementations, the demodulator device 213 comprises an analog-to-digital converter (ADC).

As described above, FIG. 2 illustrates a specific implementation of the touch panel sensor system 100 shown in FIG. 1A. In FIG. 2, the circuitry 104 (e.g., a sensor driver) comprises a sensor DAC 202 coupled to a buffer 204. The buffer 204 is configured to buffer the signal generated by the sensor DAC 202 and outputs the buffered drive signal to the sensor 108 (e.g., drive the driving lines 110 of the sensor 102). In implementations, the sensor DAC 202 may generate a signal having waveform characteristics represented by the equation:

$$A1 \cdot \sin(\omega t), \qquad \text{EQN. 1,}$$

where A1 represents the amplitude of the signal, $\omega$ represents the angular frequency of the signal, and t represents time. However, in other implementations, the sensor DAC 202 may be configured to output other signals having other waveform characteristics, such as signals having square waveform characteristics, and so forth.

In one or more implementations, the system 100 is configured to measure a change in mutual-capacitance ($C_M$) within the sensor 102 and a change in self-capacitance ($C_S$) within the sensor 102. The mutual-capacitance ($C_M$) is capacitance that occurs between two electrodes (e.g., conductors). For example, the mutual-capacitance is the capacitance between the driving lines 110 and the sensing lines 112 that comprise the sensor 102. In some implementations, the driving lines 110 and the sensing lines 112 are non-intersecting. In other implementations, the driving lines 110 and the sensing lines 112 are perpendicular to one another.

The self-capacitance is the capacitance associated with the respective column line ($C_{SS}$) or the respective row line ($C_{SD}$), which represents the amount of electrical charge to be furnished to the respective sensor electrode to raise its electrical potential by one unit (e.g., one volt, etc.). For example, in a self-capacitance mode of operation, the rows (or columns) may be driven and sensed (e.g., one line at a time).

In an implementation, the controller 108 is configured to cause the input circuitry 106 to scan at least a portion (e.g., subset) of rows or columns in parallel to determine a change in mutual-capacitance at the scanned rows or columns. In another implementation, the controller 108 is configured to cause the input circuitry to scan at least a portion of the rows or columns in an interleaved protocol to determine a change in mutual-capacitance to detect a hover event. An electric field is generated between a driven row 109 (or column 111) and a parallel non-driven row 109 (or column 111). The input circuitry 106 is configured to detect a change in mutual-capacitance due to an object at least partially altering the electric field. For example, the input circuitry 106 may detect a change in mutual-capacitance from an object that is hovering over the touch panel 102. In an implementation, the input circuitry 106 may be configured to detect objects that are hovering over the touch panel 102 up to a distance of at least approximately two hundred millimeters (200 mm).

Figure 1B:
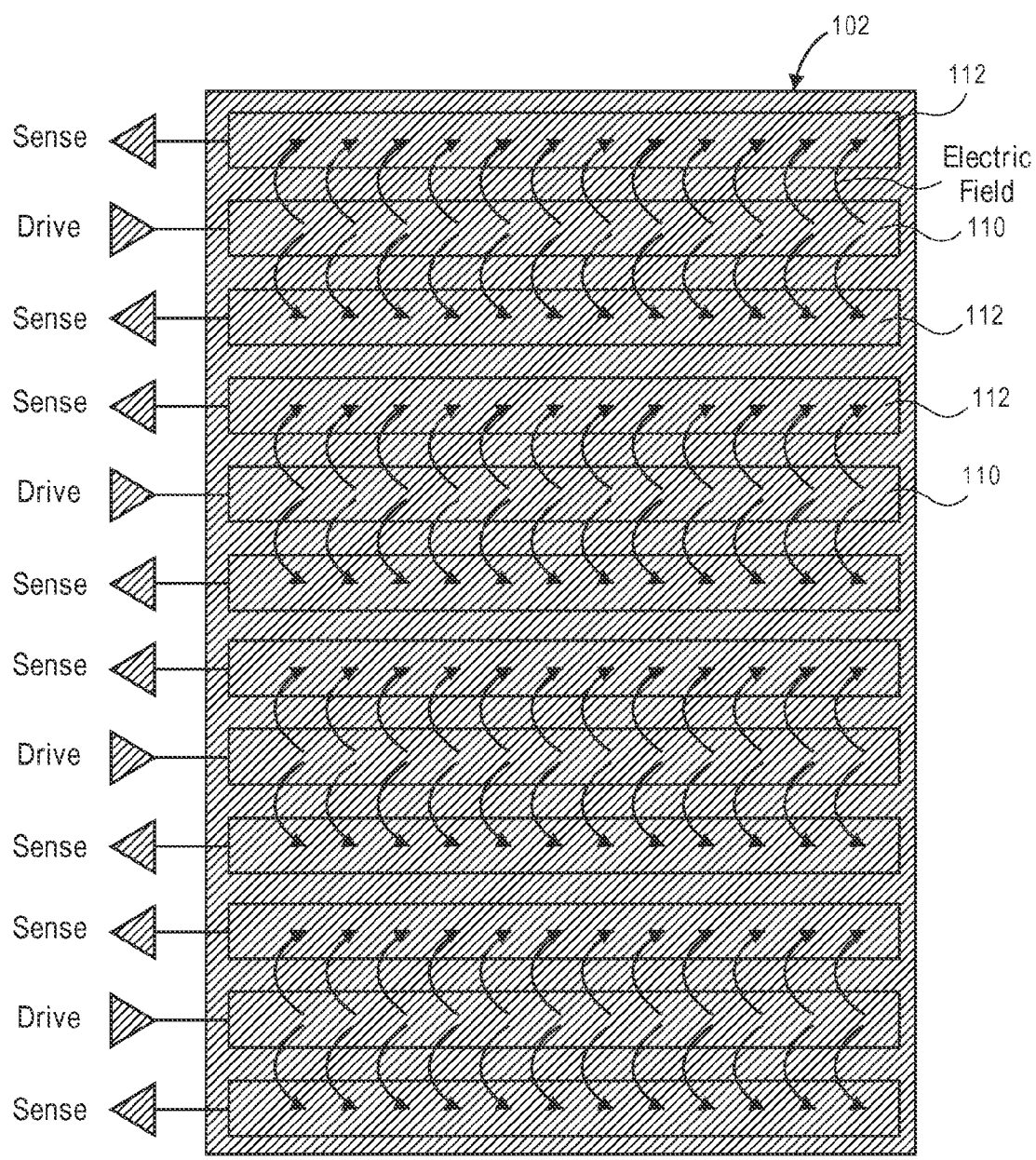
FIGS. 1B through 1D are block diagrams illustrating various subsets of electrodes of the touch panel sensor system illustrated in FIG. 1A in accordance with example implementations of the present disclosure.
Figure 1C:
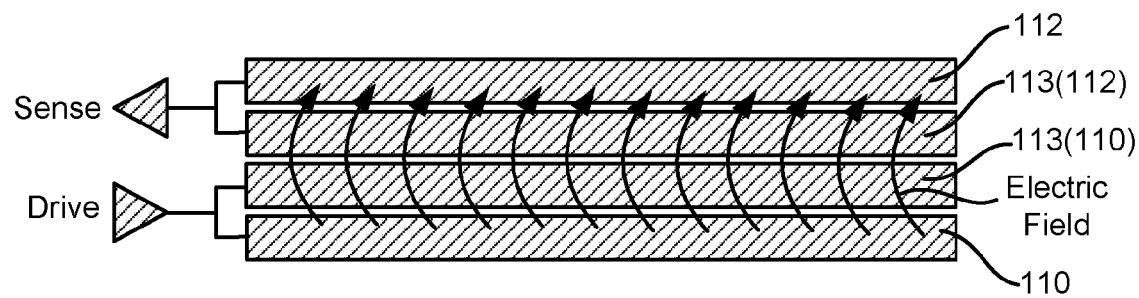

As shown in FIG. 1C, the controller 108 may be configured to drive multiple rows 109(110) (or columns 111(110)) and to sense parallel non-driven rows 109(112) (or columns 111(112)). For example, the output circuitry 104 may be configured to drive multiple parallel rows 109(110) (or columns 111(110)) during a first time interval. An electric field is created between the driven rows 109(110) (or columns 111(110)) and parallel non-driven rows 109(112) (or columns 111(112)). In some implementations, as shown in FIG. 1B, the non-driven rows 109(112) (or columns 111(112)) are adjacent to the driven rows 109(110) (or columns 111(110)). Thus, an electric field may be generated between a subset of driven rows 109(110) (or columns 111(110)) a subset of parallel non-driven rows 109(112) (or columns 111(112)). However, it is understood that while two rows are driven and two non-intersecting rows are sensed, more or less rows or columns may be driven and sensed according to the design of the system 100. Additionally, it is understood that multiple rows (or columns) can be driven while a single row (or column) is sensed, or vice versa. For example, two or more rows 109(110) (or columns 111(110)) may be driven while a single adjacent non-driven row 109(112) (or column 111(112)) is sensed. In another example, a single row 109(110) (or column 111(110)) may be driven while a two or more adjacent non-driven rows 109(112) (or columns 111 (112)) are sensed.

Figure 1D:
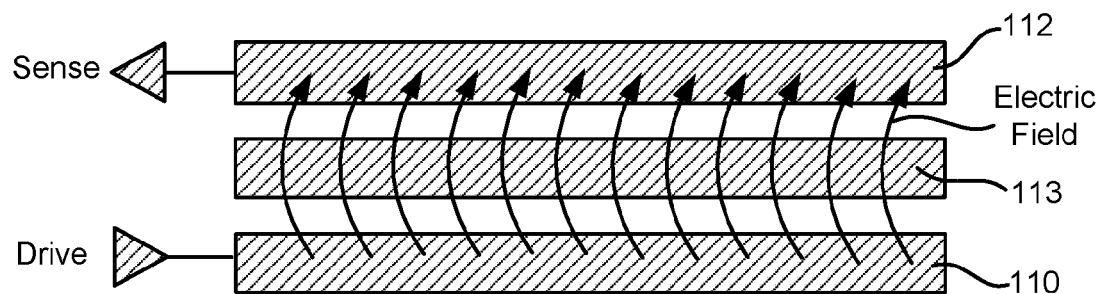

In another implementation, as shown in FIG. 1D, the controller 108 is configured to drive one or more rows 109(110) (or columns 111(110)) and to measure a mutual-capacitance between the driven row(s) 109(110) (or column(s) 111(110)) and one or more non-adjacent non-driven rows 109 (or columns 111). Thus, the input circuitry 106 is configured to measure a change in capacitance between a driven row 109(110) (or column 111(110)) and a non-adjacent non-driven row 109 (or column 111). As shown in FIGS. 1C and 1D, one or more intermediary electrodes 113, (which may be rows 109 or columns 111) may be positioned between the driven row 109 (or column 111) and the sensed row 109 (or column 111). The example shown in FIG. 1C includes a driven intermediary electrode 113(110) and a non-driven intermediary electrode 113(112). In the implementation shown in FIG. 1D, the intermediary electrode 113 (which may be a row electrode 109 or a column electrode 111) may float (may not be connected to a voltage source). In another implementation, the intermediary electrode 113 (a row 109 or a column 111) may be connected to a voltage source, such as electrical ground, or the like.

Figure 3:
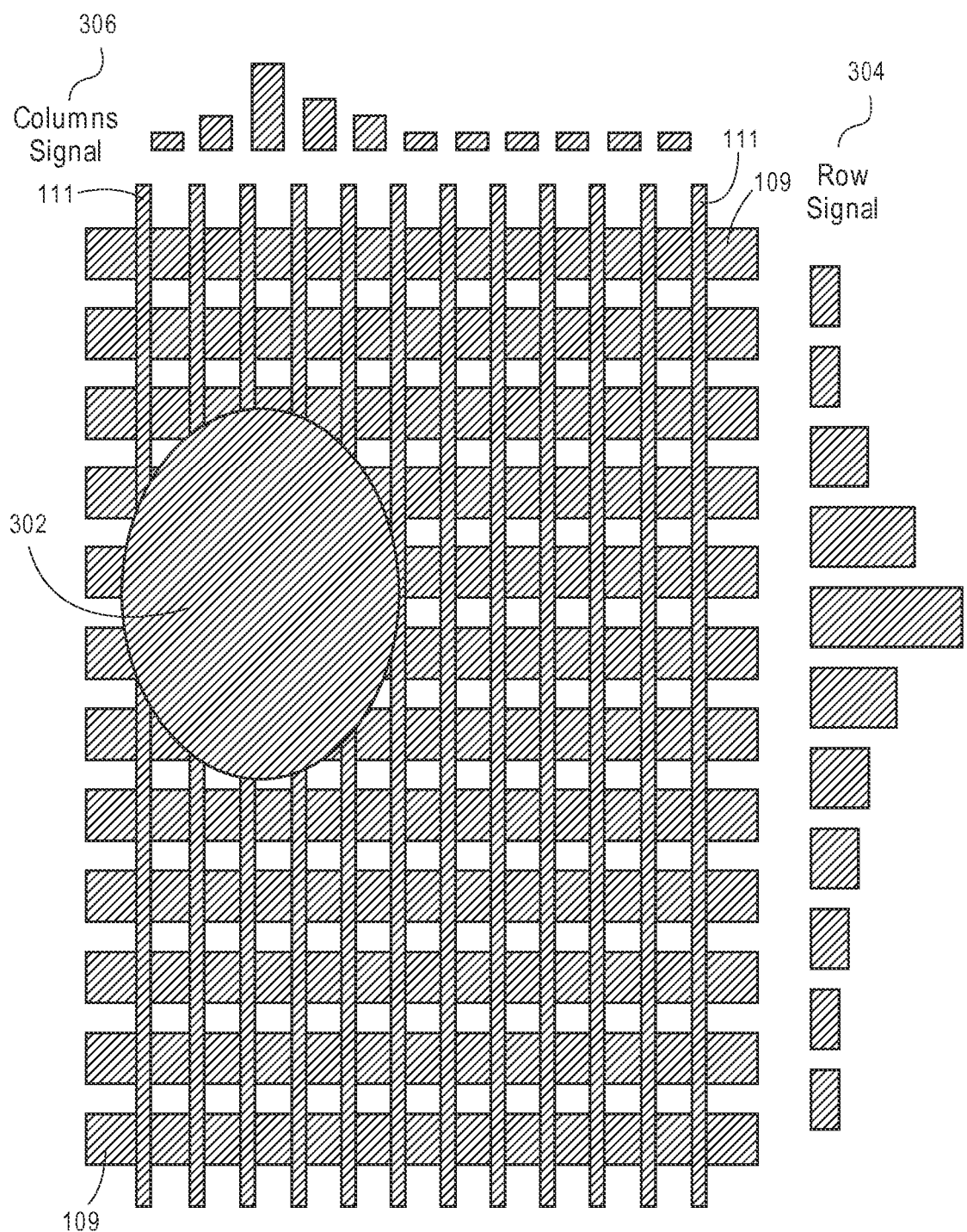
FIG. 3 is a circuit diagram illustrating an object performing a hover event over a touch panel employing a touch panel sensor in accordance with an example implementation of the present disclosure.

FIG. 3 illustrates an object positioned over the touch panel sensor 102. Oval region 302 represents an object, such as a finger or a stylus, hovering over the touch panel sensor 102. As described above, the input circuitry 106 is configured to measure a change in capacitance due to the hover event. As shown in FIG. 3, the relative signal strength, or relative signal magnitude, for one or more rows 109 as measured by the input circuitry 106 is depicted by graphical representation 304, and the relative signal strength, or relative signal magnitude, for one or more columns 111 as measured by the input circuitry 106 is depicted by graphical representation 306. The relative signal strength represents the change in mutual-capacitance as measured by the input circuitry 106 due to the object performing a hover event over the touch panel sensor 102. Additionally, the relative signal strength may account for one or more calibration characteristics of the touch panel (e.g., noise, etc.). In an implementation, the controller 108 is configured to drive a first subset of rows 109 to measure changes in mutual-capacitance at non-intersecting non-driven rows 109 during a first time interval. The controller 108 is configured to drive a first subset of columns 111 to measure changes in mutual-capacitance at non-intersecting non-driven columns 111 during a second time interval. Based upon the measured changes in mutual-capacitance, the controller 108 is configured to determine an approximate position of the object hovering over the touch panel sensor 102. For example, the controller 108 is configured to determine an approximate position of the object based upon the intersection of the greatest relative signal strength corresponding to the rows 109 and greatest relative signal strength corresponding to the columns 111.

Example Methods

Figure 4:
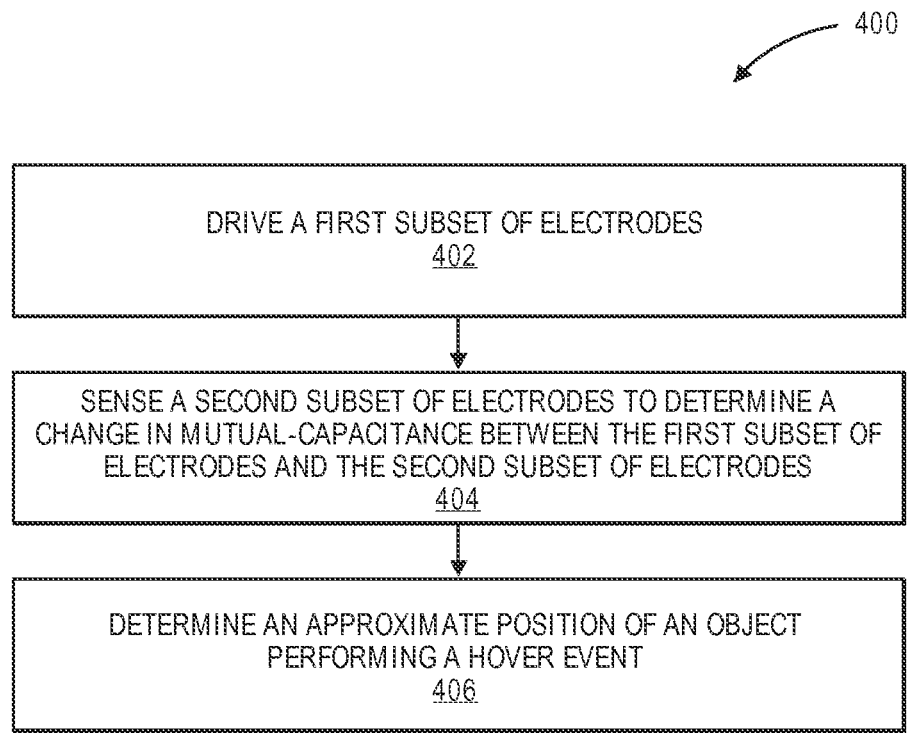
FIG. 4 is a flow diagram illustrating an example method for detecting (e.g., identifying, measuring) an object performing a hover event over a touch panel sensor in accordance with an example implementation of the present disclosure.

FIG. 4 illustrates a method 400 for detecting a hover event performed over a touch panel sensor system according to an example implementation of the present disclosure. A first subset of electrodes is driven (Block 402). In an implementation, the touch panel controller 108 is configured to cause the output circuitry 104 to generate one or more drive signals having a frequency characteristic to drive a first subset of rows 109 or columns 111. The drive signals drive the corresponding rows 109 or columns 111, which allows the input circuitry 106 to sense (e.g., determine) changes in mutual-capacitance within the touch panel sensor 102. A second subset of electrodes is sensed to determine a change in mutual-capacitance between the first subset of electrodes and the second subset of electrodes (Block 404). As described above, the touch panel controller 108 and/or the processing device 120 is configured to measure, or scan, a second subset of rows 109 or columns 111. For instance, the controller 108 and/or the processing device 120 is configured to measure a change in mutual-capacitance between a driven electrode (e.g., with the first subset of electrodes) and a non-intersecting non-driven electrode (e.g., within the second subset of electrodes).

An approximate position of an object performing a hover event is determined (Block 406). As described above with respect to FIG. 3, the controller 108 is configured to drive a first subset of rows 109 to measure changes in mutual-capacitance between the driven rows 109 and non-intersecting non-driven rows 109 during a first time interval. The controller 108 is configured to drive a first subset of columns 111 to measure changes in mutual-capacitance between the driven columns 111 and non-intersecting non-driven columns 111 during a second time interval. Based upon the measured changes in mutual-capacitance, the controller 108 (or the processing device 120) is configured to determine an approximate position of the object hovering over the touch panel sensor 102. For example, the controller 108 (or the processing device 120) is configured to determine an approximate position of the object based upon the intersection of the greatest relative signal strength corresponding to the rows 109 and greatest relative signal strength corresponding to the columns 111. Thus, the controller 108 (or the processing device 120) determines that the position of the object comprises the intersection of the greatest relative signal strength corresponding to the rows 109 and the greatest relative signal strength corresponding to the columns 111.

CONCLUSION

Generally, any of the functions described herein can be implemented using hardware (e.g., fixed logic circuitry such as integrated circuits), software, firmware, manual processing, or a combination of these implementations. Thus, the blocks discussed in the above disclosure generally represent hardware (e.g., fixed logic circuitry such as integrated circuits), software, firmware, or a combination thereof. In the instance of a hardware implementation, for instance, the various blocks discussed in the above disclosure may be implemented as integrated circuits along with other functionality. Such integrated circuits may include all of the functions of a given block, system or circuit, or a portion of the functions of the block, system or circuit. Further, elements of the blocks, systems or circuits may be implemented across multiple integrated circuits. Such integrated circuits may comprise various integrated circuits including, but not necessarily limited to: a monolithic integrated circuit, a flip chip integrated circuit, a multichip module integrated circuit, and/or a mixed signal integrated circuit. In the instance of a software implementation, for instance, the various blocks discussed in the above disclosure represent executable instructions (e.g., program code) that perform specified tasks when executed on a processor. These executable instructions can be stored in one or more tangible computer readable media. In some such instances, the entire system, block or circuit may be implemented using its software or firmware equivalent. In other instances, one part of a given system, block or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a touch panel controller coupled to a touch panel sensor, the touch panel sensor including a plurality of row and column sets of electrodes, each set of row electrodes including at least one row drive electrode and at least one row sense electrode, each set of column electrodes including at least one column drive electrode and at least one column sense electrode, the at least one row sense electrode in parallel along a first direction with the at least one row drive electrode and the at least one column sense electrode in parallel along a second direction with the at least one column drive electrode, the touch panel controller comprising:
output circuitry coupled to the at least one row drive electrode of each set of row electrodes and coupled to the at least one column drive electrode of each set of column electrodes, the output circuitry configured to generate drive signals to drive the at least one row drive electrode and the at least one column drive electrode of each set of row electrodes and each set of column electrodes; and
input circuitry coupled to the at least one row sense electrode of each set of row electrodes and coupled to the at least one column sense electrode of each set of column electrodes, the input circuitry configured to measure mutual capacitance between the at least one row or column drive electrode and the at least one row or column sense electrode of each set of row or column electrodes to detect a hover event, wherein the touch panel controller is configured to:
cause the output circuitry to drive at least one row drive electrode of a set of row electrodes during a first time interval;
sense a change in mutual capacitance between the at least one row drive electrode and at least one row sense electrode of the set of row electrodes during the first time interval to detect a row hover event;
cause the output circuitry to drive at least one column drive electrode of a set of column electrodes during a second time interval;
sense a change in mutual capacitance between the at least one column drive electrode and at least one column sense electrode of the set of column electrodes during the second time interval to detect a column hover event; and
approximate a hover event position based upon the row hover event and the column hover event.

2. The apparatus as recited in claim 1, further comprising an intermediary electrode disposed either between the at least one row drive electrode and the at least one row sense electrode of at least one set of row electrodes without intersecting either of the at least one row drive electrode or the at least one row sense electrode, or between the at least one column drive electrode and the at least one column sense electrode of at least one set of column electrodes without intersecting either of the at least one column drive electrode or the at least one column sense electrode.

3. The apparatus as recited in claim 1, wherein at least one row drive electrode of a set of row electrodes is adjacent to at least one row sense electrode of the set of row electrodes or at least one column drive electrode of a set of column electrodes is adjacent to at least one column sense electrode of the set of column electrodes.

4. The apparatus as recited in claim 1, wherein the output circuitry comprises a digital-to-analog converter coupled to a buffer, the buffer coupled to at least one row drive electrode of a set of row electrodes and at least one column drive electrode of a set of column electrodes.

5. The apparatus as recited in claim 1, wherein the input circuitry comprises a charge amplifier, the charge amplifier further comprising an operational amplifier having an inverting input terminal, a non-inverting input terminal, and an output terminal, the inverting input terminal coupled to at least one row sense electrode of a set of row electrodes and at least one column sense electrode of a set of column electrodes; and an integrating capacitor electrically coupled between the inverting input terminal and the output terminal.

6. The apparatus as recited in claim 1, wherein approximating the hover event position involves determining an intersection of the row hover event and the column hover event.

7. The apparatus of claim 1, wherein approximating the hover event position involves determining an intersection of greatest signal strength corresponding to row electrodes and greatest signal strength corresponding to column electrodes.

8. An apparatus comprising:
a touch panel controller coupled to a touch panel sensor, the touch panel sensor including a plurality of row electrodes and a plurality of column electrodes, the plurality of row electrodes including sets of row drive electrodes and sets of row sense electrodes, subsets of the sets of row sense electrodes non-intersecting with corresponding subsets of the sets of row drive electrodes and the plurality of column electrodes including sets of column drive electrodes and sets of column sense electrodes, subsets of the sets of column sense electrodes non-intersecting with corresponding subsets of the sets of column drive electrodes, the touch panel controller comprising:
output circuitry coupled to the plurality of row drive electrodes and the plurality of column drive electrodes, the output circuitry configured to generate drive signals to drive the row drive electrodes and the column drive electrodes; and
input circuitry coupled to a subset of row and column electrodes, the input circuitry configured to measure mutual capacitance between the sets of row and column drive electrodes and the sets of row and column sense electrodes to detect a hover event, wherein the touch panel controller is configured to:
cause the output circuitry to drive a subset of row drive electrodes during a first time interval;
sense a change in mutual capacitance between the subset of row drive electrodes and a subset of row sense electrodes during the first time interval to detect a row hover event;
cause the output circuitry to drive a subset of column drive electrodes during a second time interval;
sense a change in mutual capacitance between the subset of column drive electrodes and a subset of column sense electrodes during the second time interval to detect a column hover event; and approximate a hover event position based upon the row hover event and the column hover event.

9. The apparatus as recited in claim 8, wherein the output circuitry comprises a digital-to-analog converter coupled to a buffer, the buffer coupled to at least one row drive electrode and at least one column drive electrode.

10. The apparatus as recited in claim 8, wherein the input circuitry comprises a charge amplifier, the charge amplifier further comprising an operational amplifier having an inverting input terminal, a non-inverting input terminal, and an output terminal, the inverting input terminal coupled to at least one row sense electrode and at least one column sense electrode; and an integrating capacitor electrically coupled between the inverting input terminal and the output terminal.

11. The apparatus as recited in claim 8, wherein approximating the hover event position involves determining an intersection of the row hover event and the column hover event.

12. The apparatus of claim 8, wherein approximating the hover event position involves determining an intersection greatest signal strength corresponding to row electrodes and greatest signal strength corresponding to column electrodes.

13. A method of driving a touch panel sensor including a plurality of row and column sets of electrodes, each set of row electrodes including at least one row drive electrode and at least one row sense electrode, each set of column electrodes including at least one column drive electrode and at least one column sense electrode, the at least one row sense electrode in parallel along a first direction with the at least one row drive electrode and the at least one column sense electrode in parallel along a second direction with the at least one column drive electrode, the method comprising:

driving a subset of the row drive electrodes during a first time interval by way of output circuitry;

sensing a change in mutual capacitance between the subset of row drive electrodes and a subset of row sense electrodes during the first time interval to detect a row hover event;

driving a subset of the column drive electrodes during a second time interval by way of output circuitry;

sensing a change in mutual capacitance between the subset of column drive electrodes and a subset of column sense electrodes during the second time interval to detect a column hover event; and approximating a hover event position based upon the row hover event and the column hover event.

14. The method as recited in claim 13, wherein approximating the hover event position involves determining an intersection of the row hover event and the column hover event.

15. The method as recited in claim 13, wherein an intermediary electrode is disposed between at least one row drive electrode and at least one row sense electrode without intersecting either of the at least one row drive electrode and the at least one row sense electrode.

16. The method as recited in claim 13, wherein an intermediary electrode is disposed between at least one column drive electrode and at least one column sense electrode without intersecting either of the at least one column drive electrode and the at least one column sense electrode.

17. The method as recited in claim 13, wherein the output circuitry comprises a digital-to-analog converter coupled to a buffer, the buffer coupled to at least one row drive electrode and at least one column drive electrode.

18. The method as recited in claim 13, wherein the input circuitry comprises a charge amplifier, the charge amplifier further comprising an operational amplifier having an inverting input terminal, a non-inverting input terminal, and an output terminal, the inverting input terminal coupled to at least one row sense electrode and at least one column sense electrode; and an integrating capacitor electrically coupled between the inverting input terminal and the output terminal.

19. The apparatus of claim 13, wherein approximating the position of the hover event involves determining an intersection of greatest signal strength corresponding to row electrodes and greatest signal strength corresponding to column electrodes.

* * * * *